US009364099B2

(12) United States Patent
Zarate

(10) Patent No.: US 9,364,099 B2
(45) Date of Patent: Jun. 14, 2016

(54) WOMB EXPERIENCE COLIC CONTROLLING INFANT CARRIER

(71) Applicant: Gustavo Azgad Zarate, Redlands, CA (US)

(72) Inventor: Gustavo Azgad Zarate, Redlands, CA (US)

( * ) Notice: Subject to any disclaimer, the term of this patent is extended or adjusted under 35 U.S.C. 154(b) by 0 days.

(21) Appl. No.: 14/675,727

(22) Filed: Mar. 31, 2015

(65) Prior Publication Data

US 2016/0073791 A1  Mar. 17, 2016

Related U.S. Application Data

(60) Provisional application No. 61/973,307, filed on Apr. 1, 2014.

(51) Int. Cl.
*A47D 13/02* (2006.01)
*H04W 4/00* (2009.01)
*H04W 88/02* (2009.01)

(52) U.S. Cl.
CPC ............. *A47D 13/025* (2013.01); *H04W 4/008* (2013.01); *H04W 88/02* (2013.01)

(58) Field of Classification Search
CPC ............................... A47D 13/02; A47D 13/025
USPC .................................................. 224/158–161
See application file for complete search history.

(56) References Cited

U.S. PATENT DOCUMENTS

| D173,089 S | 9/1954 | Reich |
| D253,558 S | 12/1979 | Carter |
| D277,811 S | 3/1985 | Moore |
| 5,309,586 A * | 5/1994 | Sies .......................... A47D 9/02 297/184.13 |
| 5,361,952 A | 11/1994 | Gold |
| 5,699,558 A * | 12/1997 | Min ....................... H04R 5/023 2/338 |
| 5,791,535 A | 8/1998 | Roan et al. |
| 5,813,580 A | 9/1998 | Fair |
| 6,213,362 B1 | 4/2001 | Lorenzini et al. |
| D455,546 S | 4/2002 | Norman |
| 6,595,396 B2 | 7/2003 | Cummings et al. |
| 6,764,133 B2 * | 7/2004 | Osato .................... A47D 13/102 297/184.13 |
| 6,918,770 B2 * | 7/2005 | Odiwo ..................... A47D 9/04 434/262 |
| D507,869 S | 8/2005 | Liistro et al. |
| D509,056 S | 9/2005 | Shiraishi et al. |
| 7,048,160 B2 * | 5/2006 | Anderson .............. A41D 1/205 2/46 |
| D551,443 S | 9/2007 | Wilmink |
| 7,287,676 B2 | 10/2007 | Chua |
| 7,322,498 B2 | 1/2008 | Frost |
| 7,464,424 B1 * | 12/2008 | Formica ............... A47D 13/025 297/452.13 |
| D611,699 S | 3/2010 | Lundh |
| D615,749 S | 5/2010 | Wagner |
| D632,887 S | 2/2011 | Jones et al. |

(Continued)

OTHER PUBLICATIONS

"Bebemon Carrier is a Walking Concert for Your Baby", dated Oct. 14, 2013.*

*Primary Examiner* — Justin Larson

(57) ABSTRACT

The invention consists of an infant carrier/harness that incorporates sound speakers on the interior portion of the carrier, where the baby places his or her back; additionally, there is a "halo" speaker that is incorporated into a Head Cover of the carrier which completes the overall sound experience; it also serves to block out light. The speakers connect to a sound/white noise apparatus—or can connect to a mobile phone, or other portable device to produce sound, creating an ambient and constant "shush" sound. The object of the sound and cover is to re-create a womb-like experience. The infant carrier harness will also have the ability to plug in a mobile device to play other sounds and or music.

1 Claim, 1 Drawing Sheet

(56) References Cited

U.S. PATENT DOCUMENTS

| | | |
|---|---|---|
| D655,495 S | 3/2012 | Sauer et al. |
| D664,351 S | 7/2012 | Bergkvist et al. |
| 8,782,827 B2 * | 7/2014 | Shane ............... A47D 9/02 5/105 |
| 8,845,383 B2 * | 9/2014 | Schoen ............. A63H 33/006 297/184.13 |
| 2007/0062988 A1 | 3/2007 | Kassai et al. |
| 2007/0101604 A1 * | 5/2007 | Brazier ............... A45D 20/42 34/96 |
| 2010/0078457 A1 * | 4/2010 | Pitchford ............ A42B 1/048 224/576 |
| 2010/0147910 A1 * | 6/2010 | Schachtner ......... A47D 13/025 224/160 |
| 2015/0201761 A1 * | 7/2015 | Wollenberg ........ A47D 13/025 224/576 |

\* cited by examiner

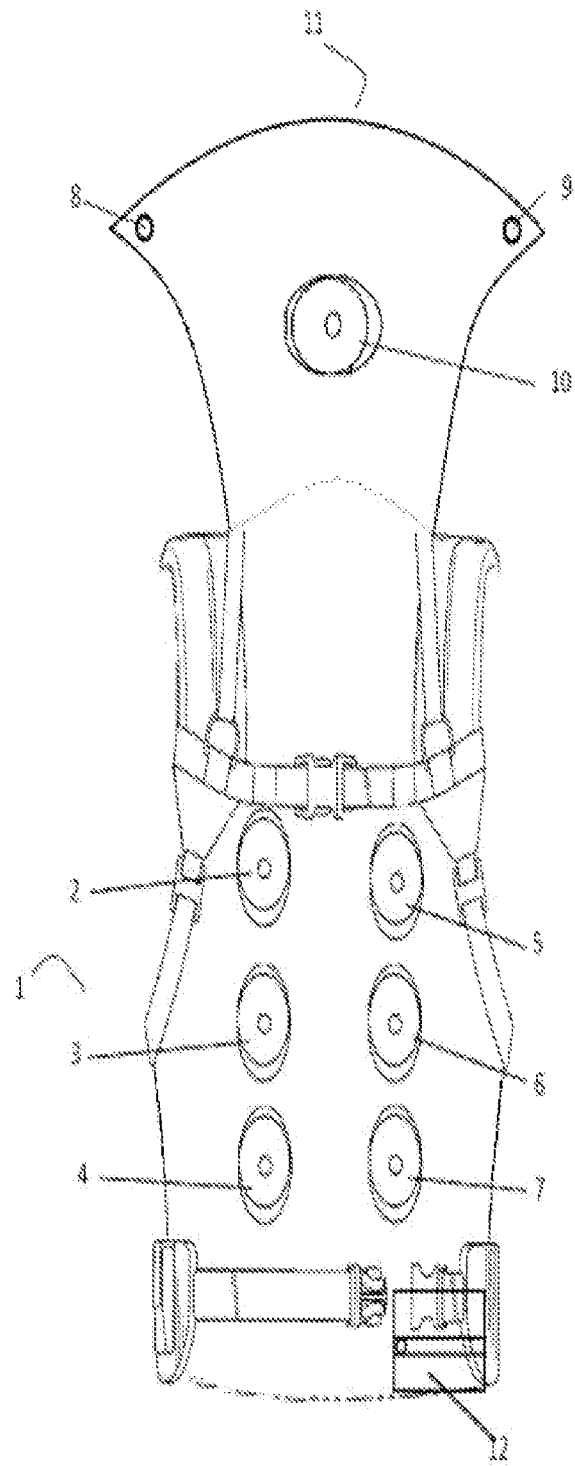

WOMB EXPERIENCE COLIC CONTROLLING INFANT CARRIER

CROSS-REFERENCE TO RELATED APPLICATIONS

This application claims priority to and the benefit of U.S. provisional patent application Ser. No. 61/973,307, filed Apr. 1, 2014, which is hereby incorporated by reference in its entirety.

BACKGROUND OF THE INVENTION

This invention relates to a lightweight child carrier that is worn by an adult with the child positioned in front of the wearer, with the child's facing the adult. Situated behind the child's back and above his head, on a cover, are sound speakers which create different sounds in order to help the child fall asleep.

Currently, there are numerous wearable child carriers on the market which are specifically designed to provide the wearer freedom of hands and arms while transporting a child in a secure carrier. All of these carriers seek to solve the same basic issue of carrying and transporting a child in a hands-free manner, in a safe and comfortable manner.

Present day carriers have evolved into very complex and complicated units, while also devolving into very simple slings and wraps used to carry and transport a child in safe and comfortable hands-free manner. There are no carriers that address the very real problem of child colic, growth spurts or mental leaps, which leave a newborn child longing and yearning for the comforts of the warm, dark, shush-noisy, womb.

SUMMARY OF THE INVENTION

It is an object of this invention to improve child carriers that are worn by adults.

It is also an object of the invention to re-create a womb-like experience for a child that is experiencing symptoms of colic, growth spurt pains or mental leap stresses.

Another object of the invention is to help parents put their crying child to sleep.

A further object of the invention is to create a noise buffer, helping the child to remain asleep in noisy environments.

These and other objects of the invention are achieved by a child carrier that is worn by an adult, whereby a child experiencing issues of crying, fussiness, sleep problems, restlessness, distractions, and other colic-like symptoms or issues is placed inside the carrier and into the womb-like environment of the carrier. The womb-like environment is created by the combination of surround sound, ambient shushing white noise generated by the integrated speakers of the carrier. Additionally, the combination solid fabric and mesh head cover blocks out light, while allowing breathability for the child and view-ability for the adult. The child in this dark environment, combined with the proximity of the adult's chest and heartbeat, together with the warmth of the adult's body heat, the rocking movement of the adult and the shushing sound generated by the speakers of the carrier, recreate a comforting and familiar experience for the child, that of the womb. The child is able to relax, block out light, other sounds and distractions to fall asleep.

BRIEF DESCRIPTION OF THE DRAWING

In order to explain these and other objects of the invention, reference is made to a detailed description of the invention which is to be read in association with the accompanying drawing, wherein:

FIG. 1 is a perspective view illustrating the inside view of the carrier where the child's back would be placed, with speakers at his back and head cover.

DESCRIPTION OF THE INVENTION

FIG. 1 shows the inside view of the carrier 1 where the child's back would be placed, with speakers at his back 2, 3, 4, 5, 6, 7 and head cover 11. The integrated speakers are behind the child's back, as well as on the head cover 10 and integrated halo speaker which is integrated into the head cover 10. There are magnets on either side of the head cover 8, 9 which attach to the main body of the carrier 13, 14.

There is a sound unit at the base 12 which plays white noise as well as various other nature sounds, lullabies, and music, which also allows for Bluetooth or the plug-in of portable devices such as a mobile phone.

What is claimed is:

1. An infant carrier incorporating a sound system to soothe a child, said infant carrier comprising:
    a main panel including a top edge, a bottom edge, and two opposed side edges;
    a waist band to encircle the waist of a wearer;
    first and second shoulder straps, each connected at an upper end thereof to a respective upper corner of the main panel and at a lower end thereof to a lower end of the main panel so as to form a loop;
    a plurality of speakers integrated into an inside area of the main panel so as to be proximate the infant's back;
    a cover for the infant's head;
    a speaker integrated into an inside area of the cover so as to be above the infant's head; and
    an electronic sound system that generates white shush noise, nature sounds, lullabies, and other music, wherein the sounds system allows for wired or Bluetooth connections of mobile phones and other electronic devices.

* * * * *